United States Patent

Nakayama et al.

Patent Number: 5,909,412
Date of Patent: Jun. 1, 1999

[54] METHOD FOR REPRODUCING OPTICAL DISK

[75] Inventors: Junichiro Nakayama, Shiki-gun; Naoyasu Iketani, Tenri; Michinobu Mieda, Shiki-gun; Yoshiteru Murakami, Nishinomiya; Akira Takahashi, Nara, all of Japan

[73] Assignee: Sharp Kabushiki Kaisha, Osaka, Japan

[21] Appl. No.: 08/977,206

[22] Filed: Nov. 24, 1997

[30] Foreign Application Priority Data

Nov. 27, 1996 [JP] Japan ................................ 8-316636

[51] Int. Cl.⁶ .............................. G11B 17/22; G11B 7/00
[52] U.S. Cl. ..................... 369/30; 369/44.13; 369/44.26; 369/44.37
[58] Field of Search .................. 369/32, 30, 43, 369/44.13, 44.25, 44.26, 44.37, 47, 48, 124, 275.4; 264/1.36

[56] References Cited

U.S. PATENT DOCUMENTS

| | | | |
|---|---|---|---|
| 5,247,507 | 9/1993 | Morimoto et al. | 369/44.26 |
| 5,303,216 | 4/1994 | Shinoda et al. | 369/44.37 |
| 5,463,614 | 10/1995 | Morita | 369/275.4 |
| 5,537,373 | 7/1996 | Horikiri | 369/44.13 |
| 5,715,217 | 2/1998 | Fuji | 369/44.26 |
| 5,820,795 | 10/1998 | Takemori et al. | 364/1.36 |

FOREIGN PATENT DOCUMENTS

798702 A2  10/1997  European Pat. Off. .

OTHER PUBLICATIONS

Published unexamined patent application, Tokukaihei 5–314538, Nov. 26, 1993.

Published unexamined patent application, Tokukaihei 6–290462, Oct. 18, 1994.

*Primary Examiner*—Paul W. Huber
*Attorney, Agent, or Firm*—David G. Conlin; William J. Daley, Jr.

[57] ABSTRACT

In a method for reproducing an optical disk of the present invention, address information of an optical disk, provided with tracking guides composed of (1) a wobbling groove wobbled in accordance with address information and (2) a normal groove which is not wobbled, is reproduced. The wobbling groove and the normal groove are alternately provided in a radius direction of the optical disk. When carrying out recording and reproducing of the optical disk, three beams composed of one main beam and two sub beams are used. The three beams are projected so that (a) the sub beams are respectively on the wobbling groove and the normal groove and (b) the main beam is on a land between the wobbling groove and the normal groove. The address information is found from reflected light of one of the sub beams. The above arrangement allows respective central portions of the sub beams to track the tracking guides. Therefore, even in the case where the optical disk is tilted or vibrated, the sub beams do not deviate totally off the tracking guides, thereby permitting to stably reproduce the address information.

14 Claims, 11 Drawing Sheets

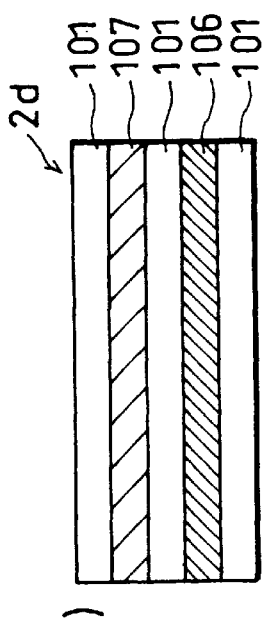
FIG.4(a)
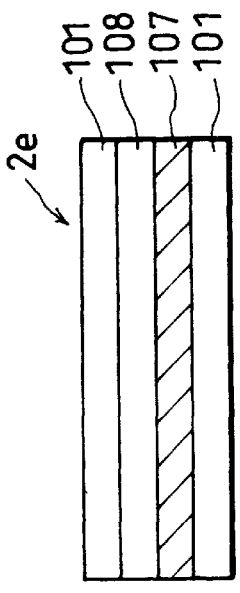
FIG.4(b)
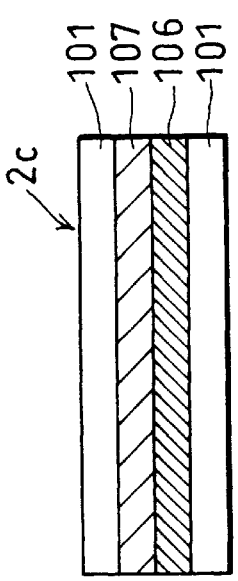
FIG.4(c)
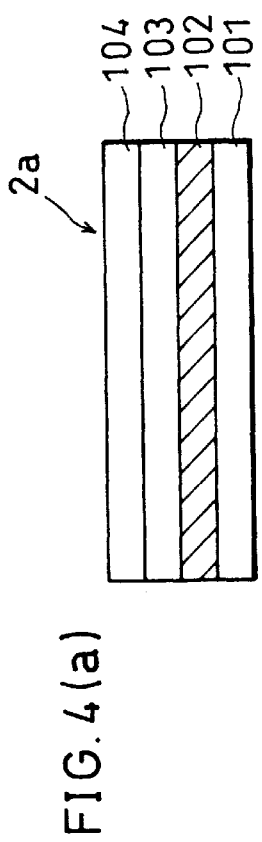
FIG.4(d)
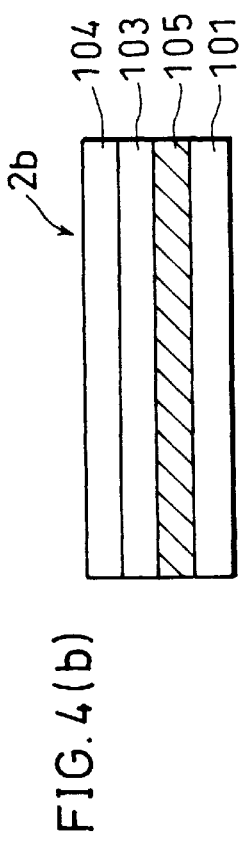
FIG.4(e)
FIG.4(f)

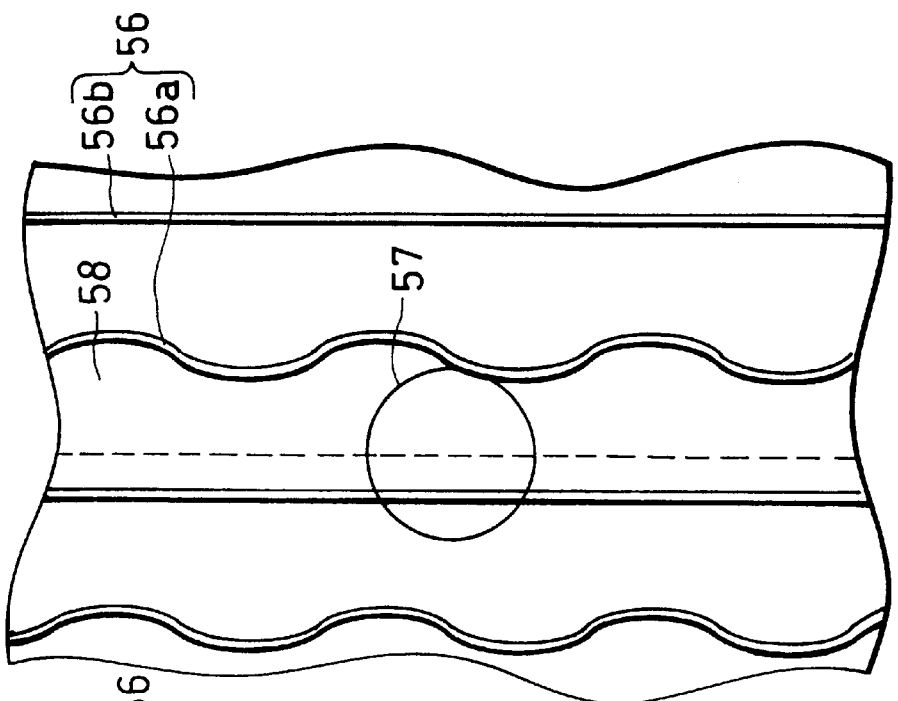
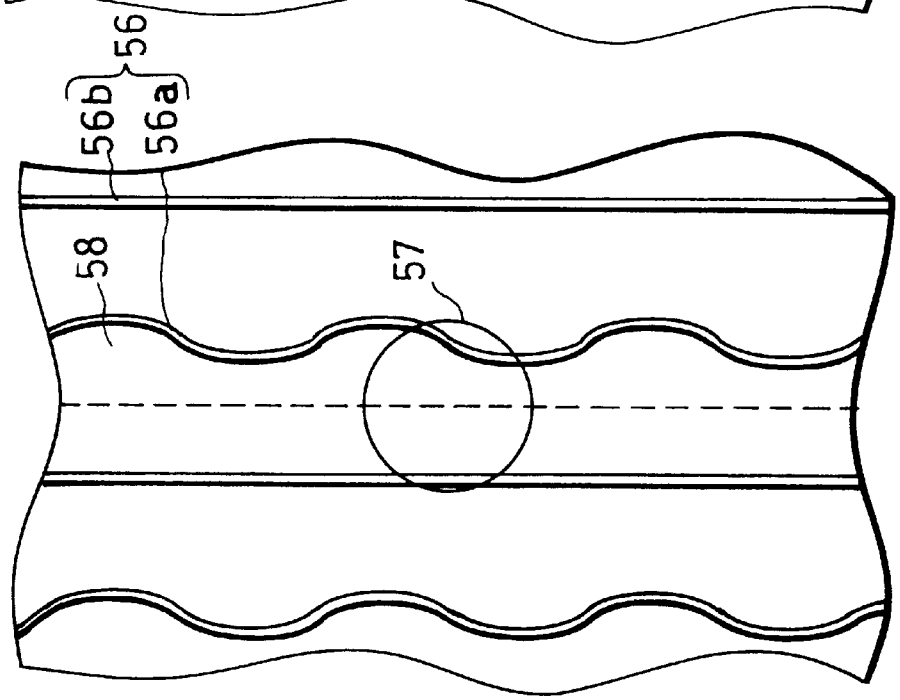

METHOD FOR REPRODUCING OPTICAL DISK

FIELD OF THE INVENTION

The present invention relates to a method for reproducing an optical disk provided with tracking control-use tracking guides composed of grooves or lands.

BACKGROUND OF THE INVENTION

As one of the methods for writing address information on an optical disk, and as a method which can meet the demand for a high density optical disk, a method in which address information is written on a tracking control-use groove or land is available. In this method, the tracking control-use groove or land is wobbled, and a component of a wobbling frequency is extracted from a tracking error signal so as to find address information.

Japanese Unexamined Patent publication No. 314538/1993 (Tokukaihei 5-314538) discloses such a method. FIG. 10(a) through FIG. 10(c) are explanatory drawings explaining the method. As shown in FIG. 10(a) through FIG. 10(c), an optical disk adopting this method is provided with a groove 50 on a disk substrate 52 (substrate part). The groove 50 is provided such that only one of the side walls is wobbled in accordance with the address information. The address information is found by projection of a recording-reproducing-use spot 51 so as to read only one side of the groove 50. The recording-reproducing spot 51 is smaller than two times the width of the groove So.

However, in order to manufacture such a disk substrate 52, as shown in FIG. 10(b), it is required to project at least two light beams 53a and 53b which are separated from one another in a radius direction of the optical disk, and during the projection, only one of the light beams, the light beam 53a, is wobbled in the radius direction in accordance with the address information. That is to say, when manufacturing the disk substrate 52, the light beams 53a and 53b are projected so as to follow the alternate long and short lines 54 and 55, respectively, of FIG. 10(b). This presents problems that (1) the efficiency of light utilization is lowered due to the separation of a light beam into two beams, (2) the optical system becomes complex, and (3) the light beams 53a and 53b are required to be controlled independently.

In order to solve such problems, inventors of the present invention have proposed a disk substrate in Japanese Patent Application No. 176199/1996 (Tokuganhei 8-176199). Such a disk substrate has an arrangement wherein a tracking control-use tracking guides composed of grooves or lands are provided with (1) a wobbling part which is wobbled in accordance with address information and (2) a non-wobbling part. The wobbling part and the non-wobbling part are provided alternately in a radius direction the optical disk.

In the disk substrate having the described arrangement, only a single light beam is required for manufacturing thereof, thereby increasing the efficiency of the light utilization, and simplifying the optical system. Also, even in the case of reducing the size of a track pitch on the disk substrate in order to record information on the optical disk in high density, it is possible to accurately read the address information.

Incidentally, in Japanese Patent Application No. 176199/1996 (Tokuganhei 8-176199), as a method for reproducing an optical disk provided with the described disk substrate, the following method is proposed. According to this method, address information is reproduced from the wobbling part of the tracking guides by a single light beam for recording and reproducing data information. However, in the case where the address information is to be reproduced by a single light beam, it is possible that the light beam deviates off the center of the track (region where information is recorded) when the optical disk is tilted or vibrated. Hence, in such an event, address information cannot be reproduced by the proposed reproducing method.

Specifically, as shown in FIG. 11(a), with a single light beam, even when reproducing is carried out in a normal condition, a side end portion of a light beam 57 is projected on tracking guides composed of a wobbling groove 56a which is wobbled and a normal groove 56b which is not wobbled. Thus, when the light beam 57 deviates off the center of a track 58 (dotted lines in FIG. 11(a) and FIG. 11(b)), which is a region between the wobbling groove 56a and the normal groove 56b, in response to slight tilting of the optical disk or other causes, as shown in FIG. 11(b), the wobbling groove 56a and the light beam 57 deviate from one another with ease.

In such an event, the tracking error signal is obtained only from the left side portion of the light beam 57 such that the light beam 57 is returned to the center of the track 58 by controlling of a tracking servo system. However, while the controlling is carried out, the address information cannot be found from the wobbling groove. This presents a problem that the reproducing of address information becomes unstable.

Also, in the case of carrying out reproducing with a single light beam 57 in the described manner, the wobbling groove 56a is always under the side end portion of the light beam 57. This presents a drawback that the amount of signals of the address information thus obtained is small.

SUMMARY OF THE INVENTION

It is an object of the present invention to provide a method for reproducing an optical disk wherein address information, having a large amount of signals, can be stably reproduced without causing light beams to deviate totally off tracking guides even in the case where the optical disk is tilted or vibrated.

In order to achieve the above-mentioned object, a method for reproducing an optical disk of the present invention is a method for reproducing an optical disk substrate having tracking control-use tracking guides composed of (1) a wobbling part which is wobbled in accordance with address information and (2) a non-wobbling part which is not wobbled, the wobbling part and the non-wobbling part being provided alternately in a radius direction of the optical disk, the optical disk having information recording region provided between the wobbling part and the non-wobbling part, the method comprising the steps of (a) projecting a main beam on the information recording region, and projecting two sub beams respectively on the wobbling part and the non-wobbling part, respectively adjacent to the information recording region irradiated by the main beam, and (b) finding the address information of the information recording region irradiated by the main beam in accordance with respective reflected light of the two sub beams.

The above method for reproducing an optical disk is a method for reproducing address information when recording and reproducing of the optical disk are carried out. In this method, the information recorded on the information recording region of the optical disk is reproduced by the main beam, and the two tracking guides provided on the both sides of the information recording region are tracked respectively by the two sub beams. One of the tracking guides constitutes the wobbling part provided along the circumferential direction of the optical disk, which is wobbled in accordance with the address information of the adjacent information recording region. The other tracking guide constitutes the non-wobbling part provided along the circumferential direction of the optical disk, which is not wobbled. The address information of the information recording region irradiated by the main beam is found in accordance with the reflected light of the sub beams.

Here, the tracking guides are respectively tracked by the respective central portions of the two sub beams. Thus, even in the case where the optical disk is tilted or vibrated, the sub beams do not deviate totally off the tracking guides, thereby permitting to stably reproduce the address information even in such a case. Further, since the tracking guides are respectively tracked by the respective central portions of the sub beams, compared with the case where reproducing is carried out by a single light beam, it is possible to obtain larger amount of reflected light, thereby permitting to reproduce address information having a large amount of signals, and find address information more accurately.

For a fuller understanding of the nature and advantages of the invention, reference should be made to the ensuing detailed description taken in conjunction with the accompanying drawings.

BRIEF DESCRIPTION OF THE DRAWINGS

FIG. 4(a) through FIG. 4(f) are explanatory drawings showing a structure of a recording film of the optical disk of FIG. 2.

FIG. 11(a) is an explanatory drawing showing a reproducing operation, under an ideal condition, of an optical disk wherein the reproducing operation is carried out with a single light beam, and FIG. 11(b) is an explanatory drawing showing a reproducing operation, while being tilted, of an optical disk wherein the reproducing operation is carried out with a single light beam.

DESCRIPTION OF THE EMBODIMENTS

The following will describe one embodiment of the present invention.

Figure 2:
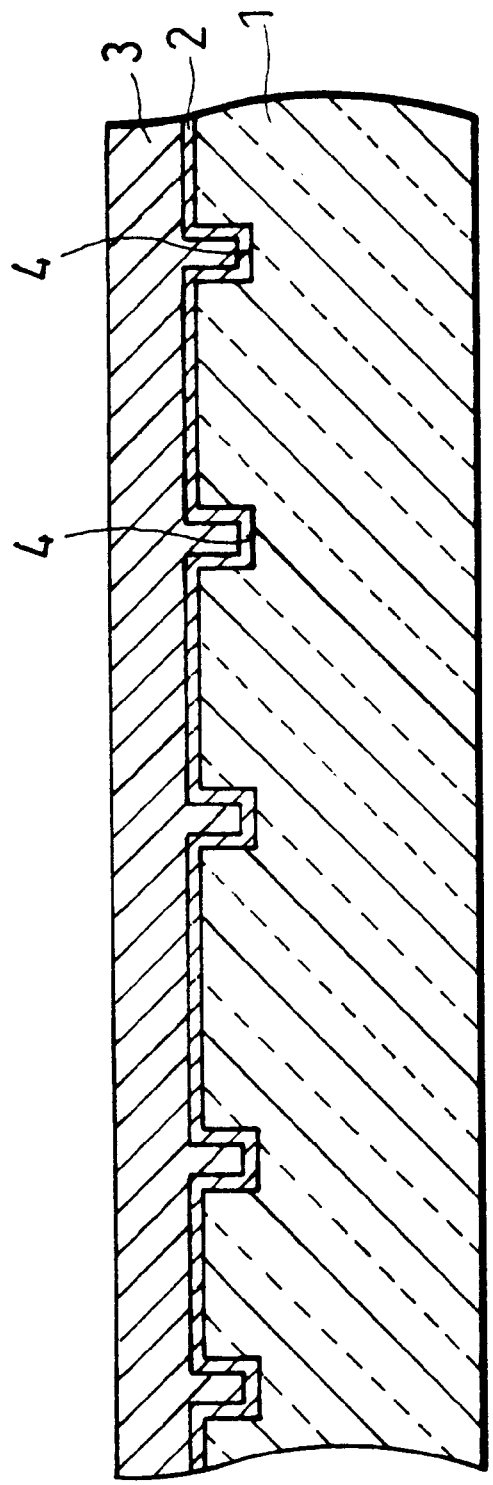
FIG. 2 is a cross sectional view of an optical disk provided with the disk substrate of FIG. 1(a) and FIG. 1(b).

FIG. 2 is a cross sectional view showing a schematic structure of an optical disk (hereinafter referred to as the present optical disk) in accordance with the present embodiment. As shown in FIG. 2, the present optical disk has an arrangement wherein a recording film 2 for recording information and an overcoating layer 3 for protecting the recording film 2 are laminated in this order on a disk substrate 1 made of translucent glass or a translucent plastic material.

Figure 3:
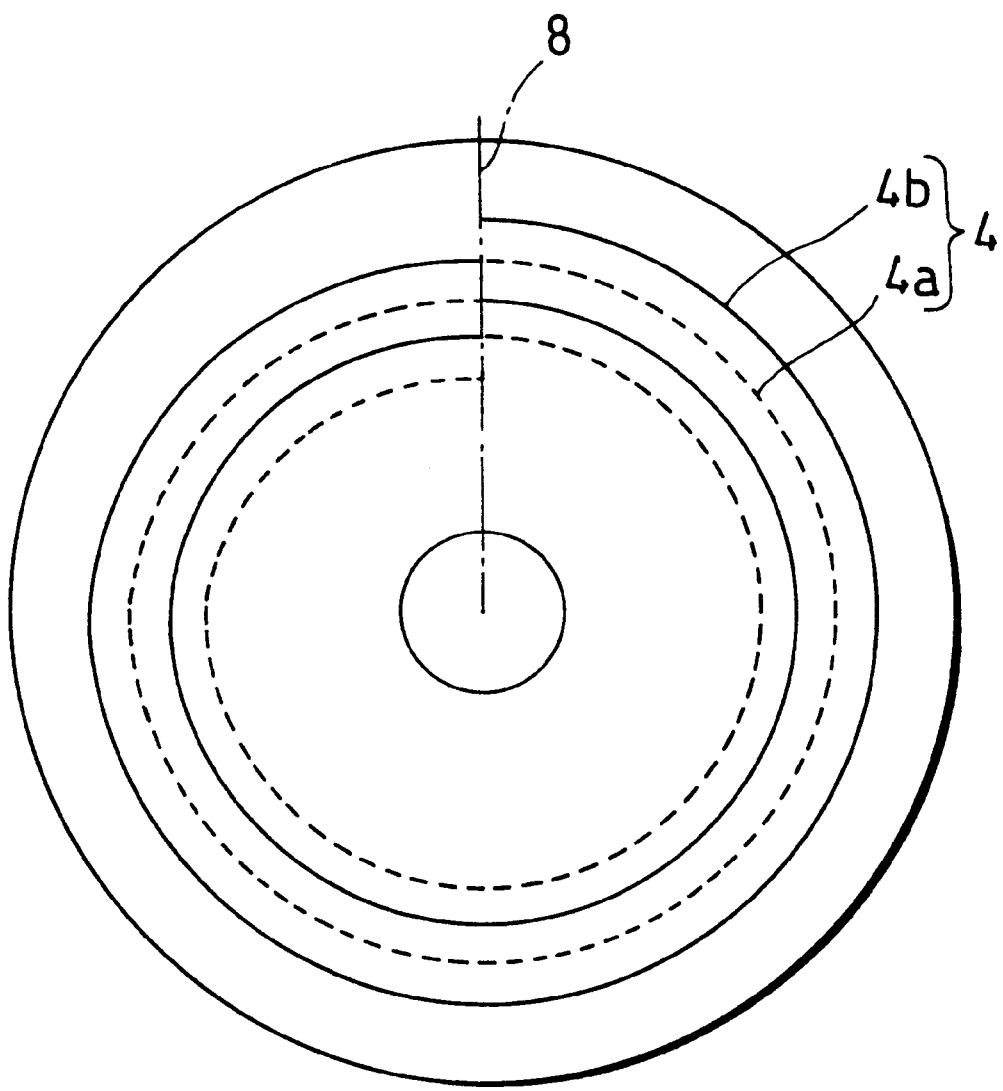
FIG. 3 is an explanatory drawing schematically showing tracking guides formed on the disk substrate of FIG. 1(a) and FIG. 1(b).

FIG. 3 is an explanatory drawing showing tracking guides provided on one surface of the disk substrate 1 of the present optical disk. As shown in FIG. 3, tracking guides 4 composed of grooves are provided in a spiral form on one surface of the disk substrate 1.

Figure 1A:
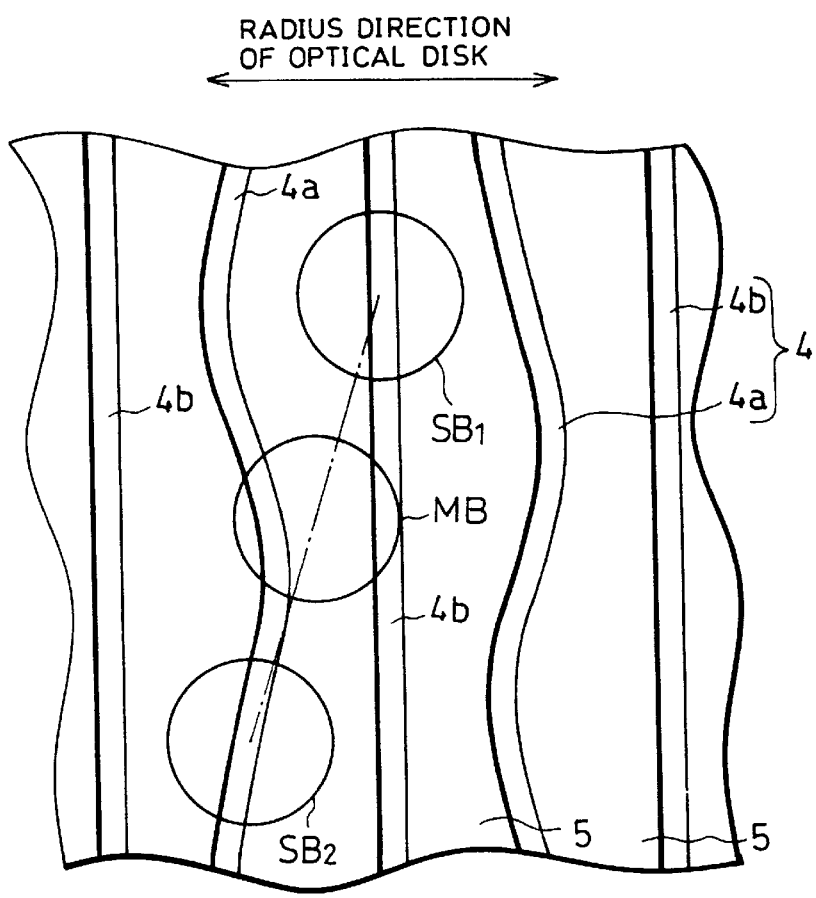
FIG. 1(a) is a plan view showing a main portion of a disk substrate of an optical disk in accordance with one embodiment of the present invention.
Figure 1B:
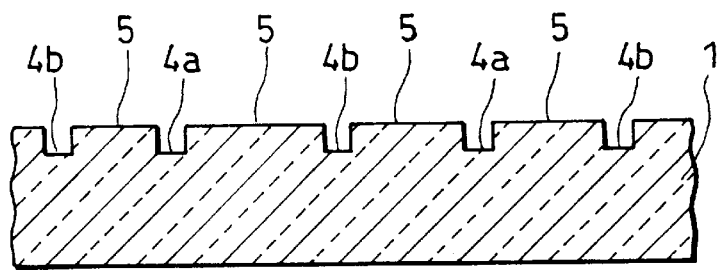
FIG. 1(b) is a cross sectional view of the portion of the disk substrate of the optical disk of FIG. 1(a).

FIG. 1(a) is a plan view showing a main portion of the surface of the disk substrate 1 provided with the tracking guides 4, and FIG. 1(b) is a cross sectional view of FIG. 1(a). As shown in FIG. 1(a) and FIG. 1(b), the tracking guides 4 are composed of a (1) wobbling groove (wobbling part) 4a wobbled in a direction of the diameter of the optical disk and (2) a normal groove (non-wobbling part) 4b which is not wobbled. As shown by the solid line and the dotted line in FIG. 3, respectively, the wobbling groove 4a and the normal groove 4b are provided alternately in the radius direction of the optical disk, whereas in a circumferential direction, the wobbling groove 4a and the normal groove 4b are provided so as to be adjacent to each other on a switching section 8.

Respective depths of the wobbling groove 4a and the normal groove 4b are set to have values in a vicinity of $\lambda/(8n)$ where $\lambda$ is the wavelength of sub beams $SB_1$ and $SB_2$ (mentioned later), and n is the index of refraction of the disk substrate 1. Also, the wobbling frequency of the wobbling groove 4a is set to have a value (1) higher than the tracking frequency of a tracking servo system and (2) lower than a recording frequency.

In the described optical disk, data information is recorded on the recording film (information recording region) 2 of a land 5 between the wobbling groove 4a and the normal groove 4b of FIG. 1(a) and FIG. 1(b). FIG. 4(a) is an explanatory drawing showing a structure of a magneto-optical recording film 2a as one example of the recording film 2. As shown in FIG. 4(a), the magneto-optical recording film 2a has a 4-layered structure having an arrangement wherein a translucent dielectric layer 101, a magnetic layer 102, a protecting layer 103, and a reflecting layer 104 are laminated in this order from the side of the disk substrate 1. The magnetic layer 102 is made of a rare earth metal-transition metal alloy such as DyFeCo, TbFeCo, DyTbFeCo, GdTbFe, or GdTbFeCo, and has a characteristic that perpendicular magnetization is exhibited at a temperature in a range of a room temperature to a Curie temperature.

The following describes a method for recording data information on the recording film 2 made of the magneto-optical recording film 2a. First, by projecting light beams from a laser light source, the temperature of the magnetic layer 102 is increased to the vicinity of the Curie temperature such that the magnetization of the magnetic layer 102 disappears or the magnetization direction thereof is reversed by a recording magnetic field. Here, for example, by applying a recording magnetic field directing upward, the magnetization direction of the magnetic layer 102 is aligned in the upward direction. Thereafter, by projecting the light beams from the laser light source in the same manner, the temperature of the magnetic layer 102 is increased to the vicinity of the Curie temperature such that the magnetization of the magnetic layer 102 disappears or the magnetization direction thereof is reversed by the recording magnetic field. Thereafter, a recording magnetic field directing downward (in the opposite direction) is applied. This aligns the magnetization direction of the magnetic layer 102 in the downward direction so that the data information is recorded. As recording methods, (1) a light modulation recording method in which a light beam is modulated and (2) a magnetic field modulation method in which a recording magnetic field is modulated may be adopted. Also, with the recording film 2 adopting the magneto-optical recording layer 2a, it is possible to carry out rewriting for more than 1 million times.

The following describes in detail how the light beams are projected on the optical disk when recording is carried out referring to FIG. 1(a). In the case of recording data information on the present optical disk in the described manner, three light beams are adopted which are composed of one main beam MB and two sub beams $SB_1$ and $SB_2$. The main beam MB is used to record data information on the recording film 2 of the land 5 provided on the disk substrate 1. The sub beams $SB_1$ and $SB_2$ are used to find address information and tracking error signals. As shown in FIG. 1(a), the light beams MB, $SB_1$, and $SB_2$ are projected on the disk substrate 1 such that the main beam MB tracks the land 5 which is a recording track, and the sub beams $SB_1$ and $SB_2$ respectively track the tracking guides 4 on the both sides of the land 5.

As shown in FIG. 1(a), the main beam MB and the sub beams $SB_1$ and $SB_2$ are normally irradiated in a direction inclined with respect to the land 5 (recording track), namely, the main beam MB and the sub beams $SB_1$ and $SB_2$ are irradiated in a direction inclined with respect to the circumferential direction of the optical disk. This arrangement is adopted in order to prevent the light beams MB, $SB_1$, and $SB_2$ from overlapping with each other when the respective spot diameters of the light beams MB, $SB_1$, and $SB_2$ are larger than a track pitch. Also, the positional relationship between (1) the sub beams $SB_1$ and $SB_2$ and (2) the main beam MB is always maintained with respect to each other in the tracking direction so that no change of positions occur.

The tracking error signals for a tracking control of the main beam MB for recording information on the recording film 2 are found from the respective reflected light of the sub beams $SB_1$ and $SB_2$ respectively tracking the wobbling groove 4a and the normal groove 4b. As a method for finding the tracking error signals from the respective reflected light of the sub beams $SB_1$ and $SB_2$, for example, the push-pull method is adopted. Of the tracking error signals obtained respectively from the sub beams $Sb_1$ and $SB_2$, only one of the signals, which is determined beforehand, is used for the tracking control.

Also, the address information is found by extracting a signal component of the wobbling frequency from the tracking error signal obtained from the reflected light of the sub beam $SB_1$ or $SB_2$ tracking the wobbling groove 4a.

For example, in FIG. 1(a), the main beam MB, the sub beam $SB_1$, and the sub beam $SB_2$ respectively track the land, the normal groove 4b, and the wobbling groove 4a. Here, since the wobbling frequency is higher than the tracking frequency of the tracking system, the main beam MB tracks the substantial center line of the average width of the land 5, and the sub beams $SB_1$ and $SB_2$ respectively track the substantial center line of the average width of the tracking guides 4. Also, a signal component corresponding to the wobbling amplitude of the wobbling groove 4a is generated from the tracking error signal obtained from the reflected light of the sub beam $SB_2$. Thus, by extracting from the tracking error signal the signal component corresponding to the wobbling amplitude of the wobbling groove 4a, it is possible to obtain a signal component of the wobbling frequency. Namely, address information is found.

Also, since either one of the sub beam $SB_1$ and the sub beam $SB_2$ tracks the central portion of the wobbling groove 4a, the address information thus found contains more signals than that contained in the address information obtained by using a recording-use light beam. Hence, stable address information is found.

Figure 5A:
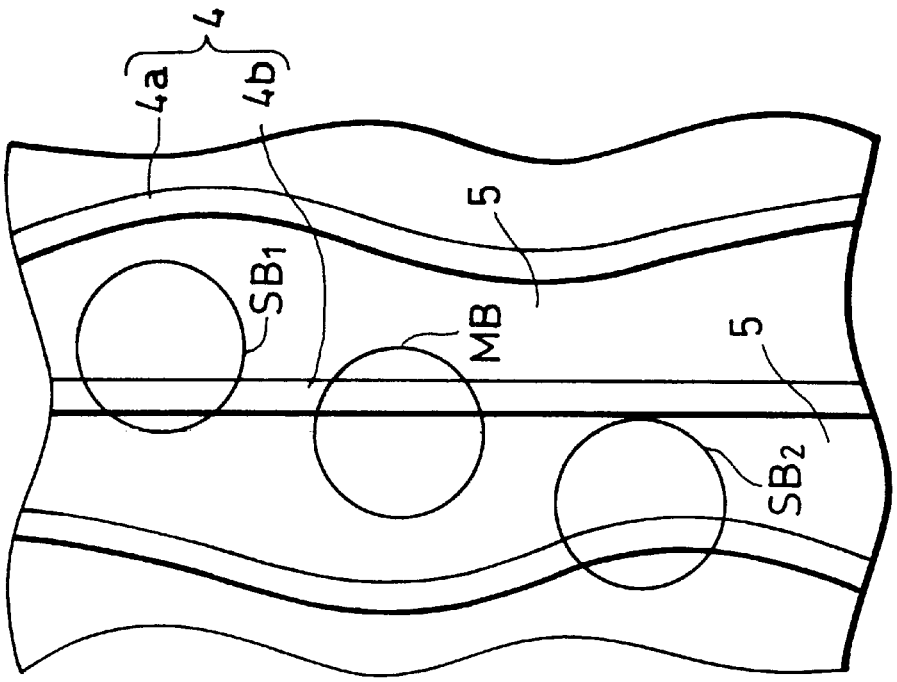
FIG. 5(a) is an explanatory drawing showing a reproducing operation of an optical disk provided with the disk substrate of FIG. 1(a) and FIG. 1(b) under an ideal condition.
Figure 5B:
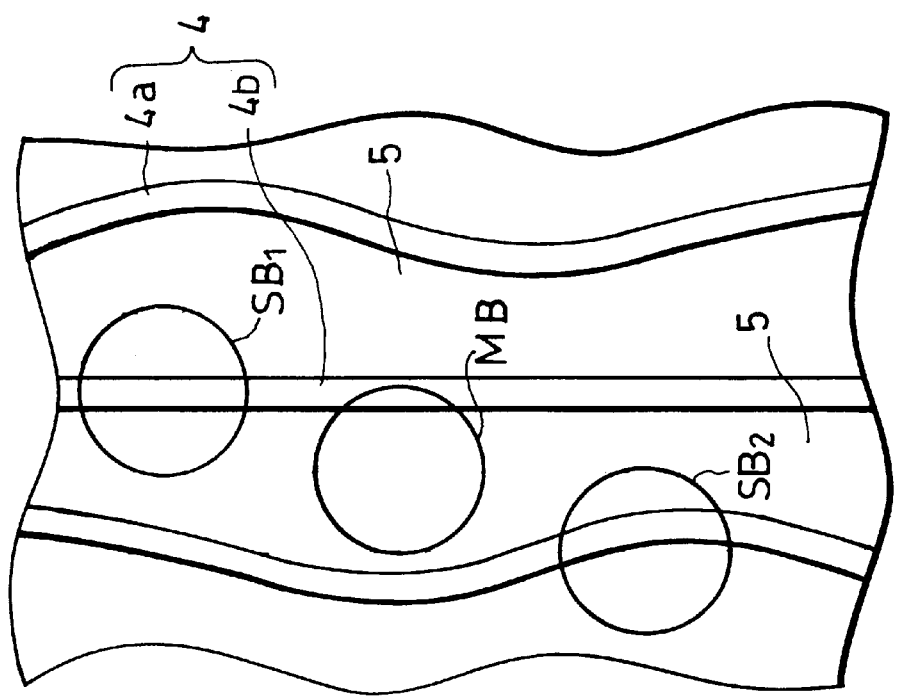
FIG. 5(b) is an explanatory drawing showing a reproducing operation of an optical disk provided with the disk substrate of FIG. 1(a) and FIG. 1(b) while being tilted.

The following describes how address information is reproduced referring to FIG. 5(a) and FIG. 5(b) in the case where the present optical disk is tilted or vibrated while being used. As shown in FIG. 5(a), in the case where recording and reproducing are carried out under an ideal condition, the main beam MB tracks the center of the land 5 (recording track). On the other hand, in the case where the optical disk is tilted or vibrated, as shown in FIG. 5(b), the main beam MB deviates off the center of the land 5. However, because the three light beams of MB, $SB_1$ and $SB_2$ are provided, even in the case where the optical disk is tilted or vibrated, the sub beams $SB_1$ and $SB_2$ are still able to track the wobbling groove 4a and the normal groove 4b on the both sides of the land 5. Thus, by the sub beam tracking the wobbling groove 4a, namely, by the sub beam $SB_2$ in FIG. 5(b), it is ensured that the address information is found.

Although the address information found in this manner is common to adjacent lands 5 on the both sides of the wobbling groove 4a, by judging which of the sub beams $SB_1$ and $SB_2$ is tracking the wobbling groove 4a, it is possible to determine with ease absolute address information of a portion of the land 5 irradiated by the main beam MB.

Also, Of the tracking error signals obtained respectively from the sub beams $Sb_1$ and $SB_2$, only one of the signals is used for the tracking control. Thus, in the case where the size of the tracking error signal obtained from the wobbling groove 4a and that obtained from the normal groove 4b are different, it is possible that the main beam MB deviates slightly off the center of the track. Nonetheless, due to the fact that the frequency of the tracking servo system is low, and the sub beams $SB_1$ and $SB_2$ alternately track the wobbling groove 4a per rotation of the optical disk, the main beam MB tracks the substantial center of the average width of the land 5. Hence, even in this case, stable address information can also be found.

Note that, although the above explanations are based on the case of reproducing address information when recording data information, a method for reproducing address information and a method for tracking control when reproducing data information can also be explained in the described manner.

As the three light beams of MB, $SB_1$, and $SB_2$, the following beams may be adopted: (1) a light beam emitted from a single laser light source which is divided into three beams, (2) zero order diffracted light (main beam MB) and first order diffracted light (sub beams $SB_1$ and $SB_2$) of a light emitted from a single laser light source, and (3) each of three light beams emitted respectively from three laser light sources. However, as long as it is ensured that three beams are provided, beams prepared by other methods may be adopted.

Also, in the explanations above, the signal component of the wobbling frequency is extracted from the tracking error signal. However, it is also possible to extract the signal component of the wobbling frequency from the change in the amount of reflected light off the optical disk. That is to say, because the amount of reflected light changes depending on whether the wobbling groove 4a is irradiated by (a) the central portion of the sub beam $SB_1$ or $SB_2$ or (b) the peripheral portion of the sub beam $SB_1$ or $SB_2$, by extracting the change in the amount of the light, it is possible to obtain the signal component of the wobbling component.

The following describes a disk substrate 1 having another structure which can be adopted in the present optical disk.

Figure 6A:
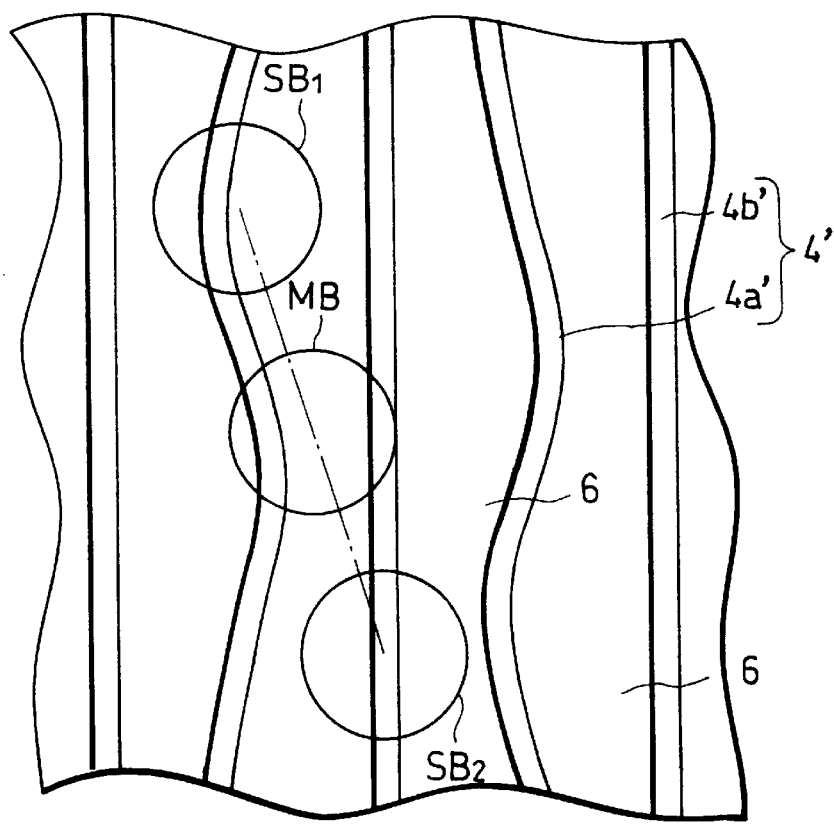
FIG. 6(a) is a plan view showing a main portion of a disk substrate of another optical disk of the embodiment of the present invention.
Figure 6B:
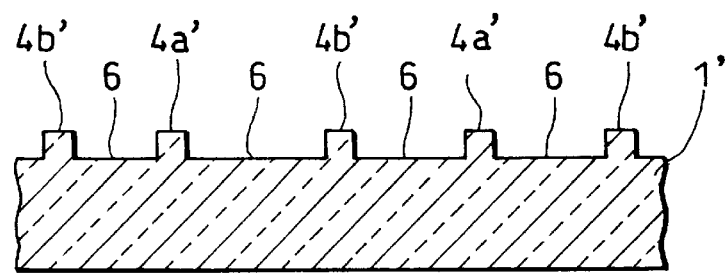
FIG. 6(b) is a cross sectional view showing the main portion of the disk substrate of the optical disk of the embodiment of the present invention.

The disk substrate 1 of FIG. 1(a) and FIG. 1(b) is provided with the tracking guides 4 composed of grooves. However, it is possible to form tracking guides 4' composed of lands as in a disk substrate 1' of FIG. 6(a) and FIG. 6(b). Namely, in this case, a wobbling land 4a' and a normal land 4b' constitute the tracking guides 4'. In this arrangement, the respective heights of the lands are also set to have values in a vicinity of $\lambda/(8n)$ where $\lambda$ is the wavelength of the sub beams $SB_1$ and $SB_2$, and n is the index of refraction of the disk substrate 1', but data information is recorded on the recording film 2 of a groove 6. In the disk substrate 1', respective positions of the land and the groove are interchanged with respect to each other, compared to the disk substrate 1 of FIG. 1(a) and FIG. 1(b). This complicates the manufacturing process as one extra step is required. However, with an optical disk provided with the disk substrate 1', it is possible to carry out groove recording.

Figure 7:
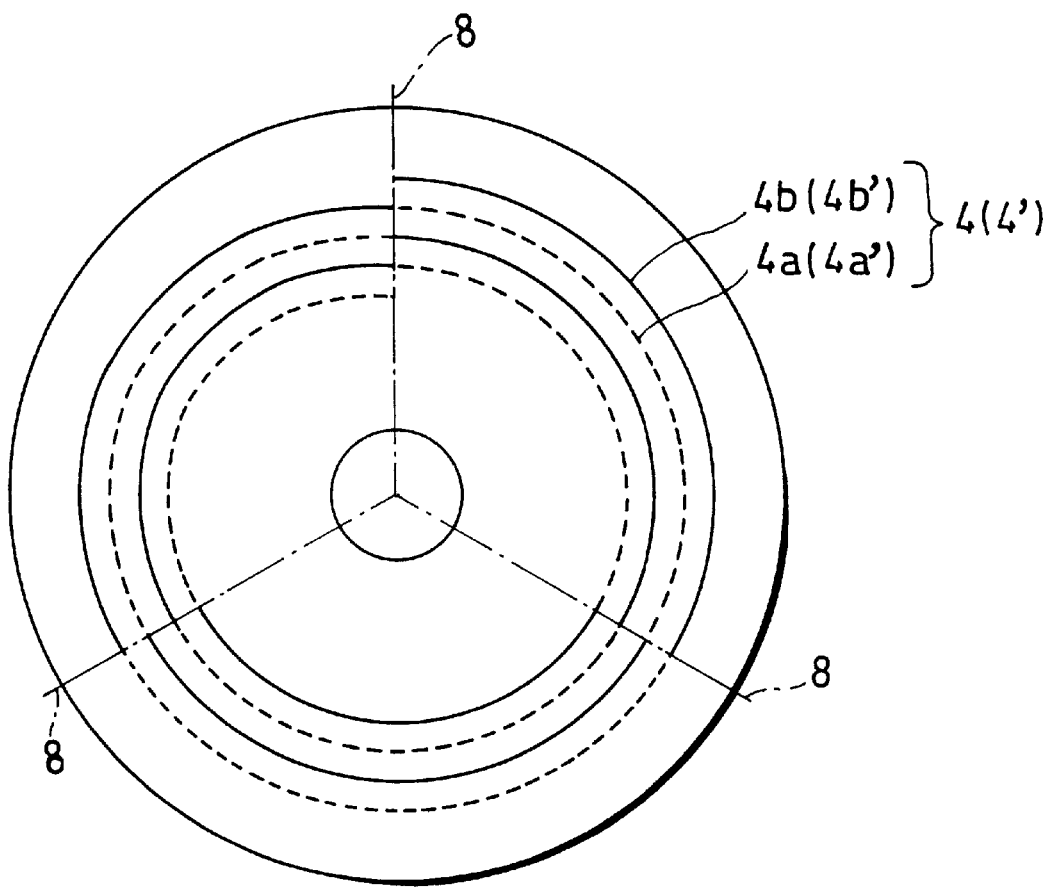
FIG. 7 is an explanatory drawing schematically showing another tracking guides which can be formed on the disk substrate of FIG. 1(a) and FIG. 1(b) or FIG. 6(a) and FIG. 6(b).
Figure 8:
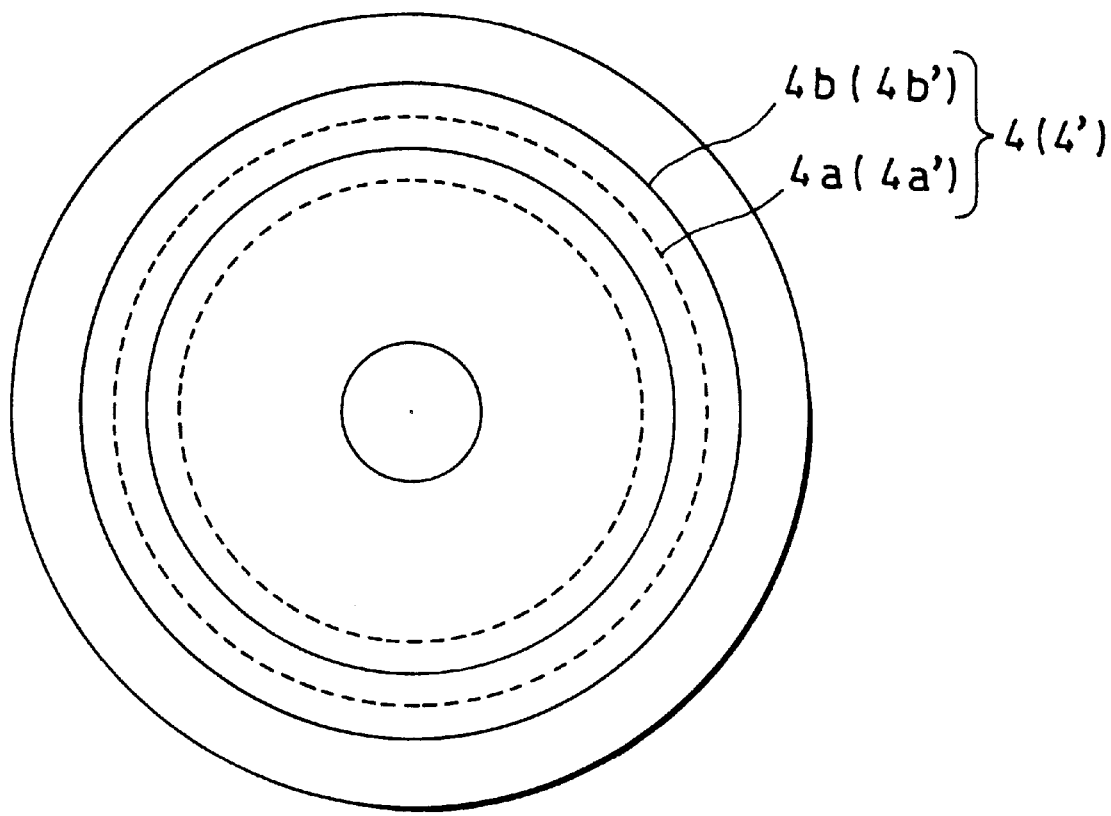
FIG. 8 is an explanatory drawing schematically showing yet another tracking guides which can be formed on the disk substrate of FIG. 1(a) and FIG. 1(b) or FIG. 6(a) and FIG. 6(b).
Figure 9:
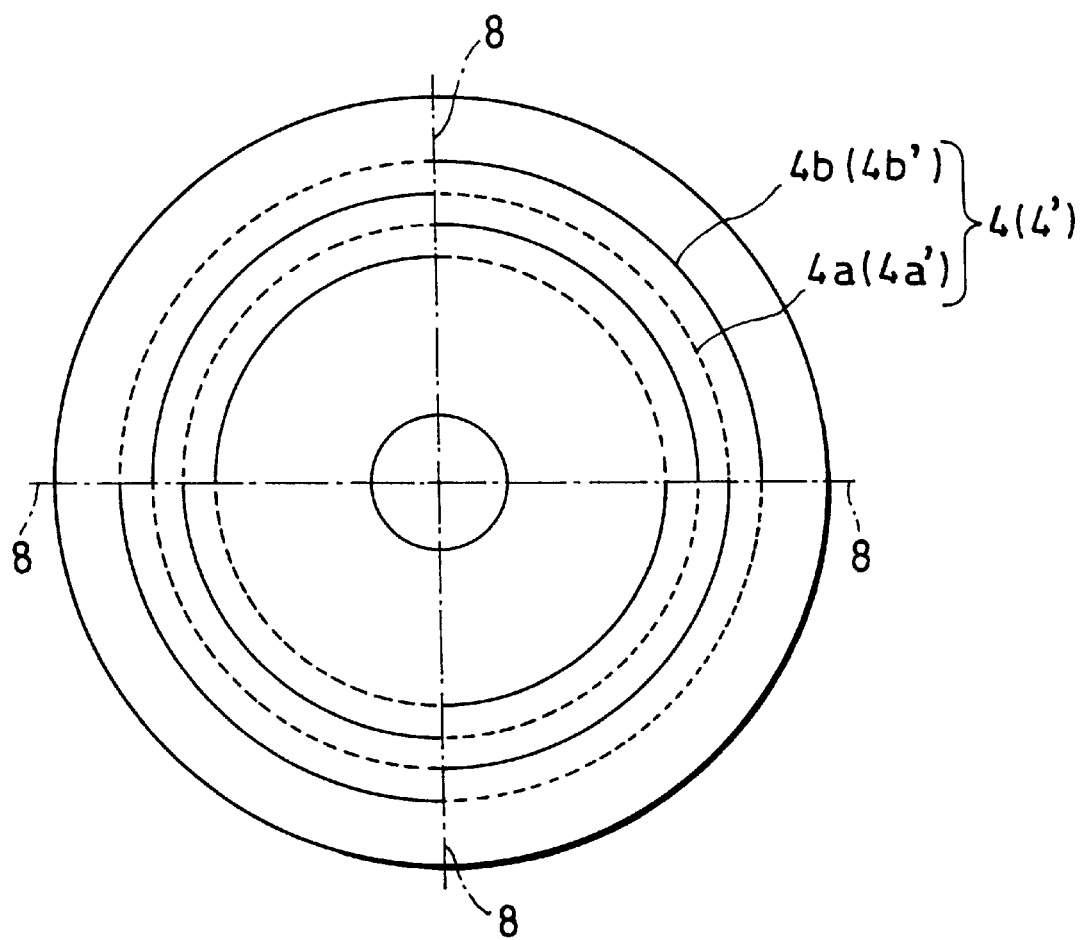
FIG. 9 is an explanatory drawing schematically showing still another tracking guides which can be formed on the disk substrate of FIG. 1(a) and FIG. 1(b) or FIG. 6(a) and FIG. 6(b).
Figure 10A:
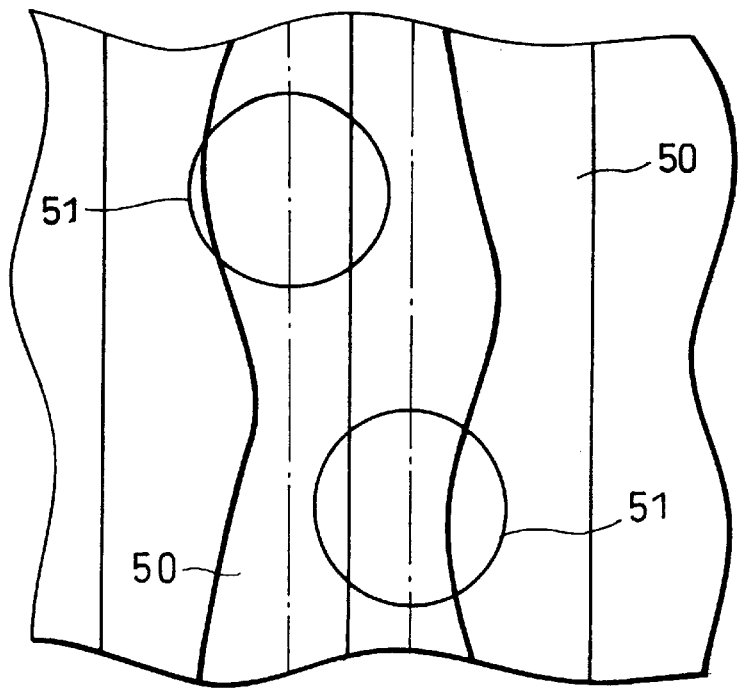
FIG. 10(a) is an explanatory drawing showing a schematic structure of a conventional optical disk substrate.
Figure 10B:
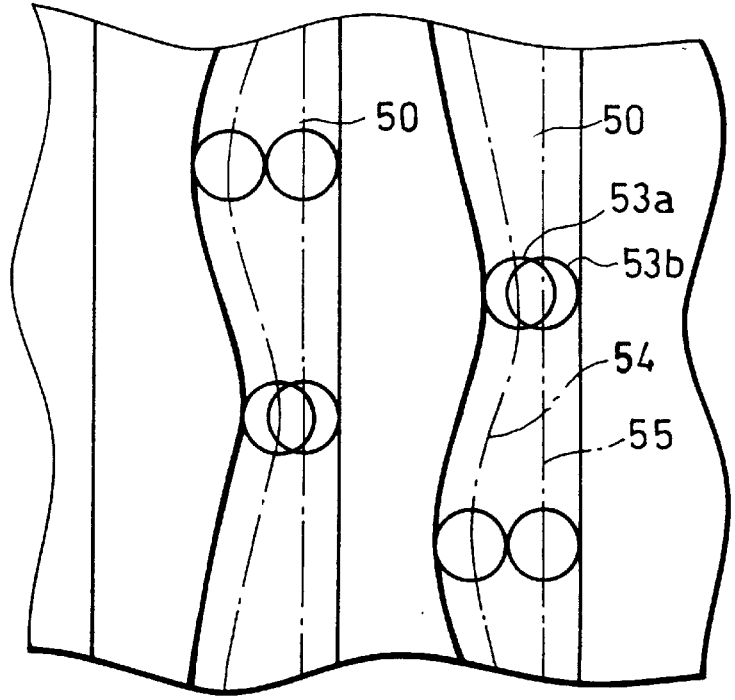
FIG. 10(b) is an explanatory drawing schematically showing a manufacturing method of the conventional optical disk substrate.
Figure 10C:
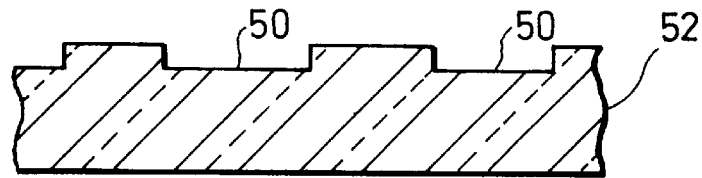
FIG. 10(c) is a cross sectional view showing the schematic structure of the conventional optical disk substrate.

The tracking guides 4 of FIG. 3 are provided with one switching section a; however, it is possible, as shown in FIG. 7, to provide three switching sections 8 so that the wobbling groove 4a and the normal groove 4b are interchanged with one another three times per rotation. Also, though the tracking guides 4 are provided in a spiral form, as shown in FIG. 8, the tracking guides 4 can be provided concentricly. Further, as shown in FIG. 9, four switching sections 8 can be provided so that the wobbling groove 4a and the normal groove 4b are interchanged with one another four times per rotation.

As described, by increasing the number of switching sections 8 provided, the sub beam $SB_1$or $SB_2$ tracking the wobbling groove 4a having data information are interchanged more frequently, thereby permitting to stably reproduce address information of a portion irradiated by the main beam MB.

Note that, the tracking guides having the above-mentioned arrangements can also be adopted in the disk substrate 1' provided with the tracking guides 4' composed of lands.

As the recording film 2 to be provided on the disk substrates 1 and 1', other than the magneto-optical recording layer 2a of FIG. 4(a), the following ① through ⑤ magneto-optical recording layers 2b through 2f may be adopted.

① Phase-Change-Type Recording Layer 2b (see FIG. 4(b))

As shown in FIG. 4(b), the phase-change-type recording layer 2b has a 4-layered structure wherein the translucent dielectric layer 101, a recording layer 105, the protecting layer 103, and the reflecting layer 104 are laminated in this order from the side of the disk substrate 1.

The recording layer 105 is made of a phase-change-type recording material such as GeSbTe. Recording of data information on the recording film 2 made of the phase-change-type recording layer 2b is carried out by the projection of a high power light beam (main beam MB) so as to make the recording layer amorphous. Thereafter, a low power light beam is projected so as to crystallize the recording layer. In short, by adopting the phase-change-type recording layer 2b, it is possible to provide a phase-change-type optical disk in which rewriting can be carried out solely by light beams.

② Magneto-Optical Recording Layer 2c (see FIG. 4(c))

As shown in FIG. 4(c), the magneto-optical recording layer 2c has a 4-layered structure wherein the translucent dielectric layer 101, a reproducing magnetic layer 106, a recording magnetic layer 107, and the translucent dielectric layer 101 are laminated in this order from the side of the disk substrate 1.

The reproducing magnetic layer 106 is made of a rare earth metal-transition metal alloy such as GdFeCo or GdDyFeCo. The recording magnetic layer 107 is made of a rare earth metal-transition metal alloy such as DyFeCo, TbFeCo, DyTbFeCo, GdTbFe, or GdTbFeCo. The reproducing magnetic layer 106 has a characteristic in that in-plane magnetization is exhibited at temperatures in a range of a room temperature to a predetermined temperature, and perpendicular magnetization is exhibited at temperatures above the predetermined temperature. The recording magnetic layer 107 has a characteristic in that perpendicular magnetization is exhibited at temperatures in a range of a room temperature to the Curie temperature.

Recording of data information on the recording film 2 made of the magneto-optical recording layer 2c is carried out in the same manner as the recording of data information on the recording film 2 made of the magneto-optical recording layer 2a.

In contrast, reproducing of data information is carried out in the following manner. Upon irradiation of a light beam (main beam MB) on the reproducing magnetic layer 106, the portion thus irradiated exhibits a temperature distribution in the form of a Guassian distribution. Thus, a temperature increase is limited in a region smaller than the diameter of the light beam. In response to the increase in temperature, a transition from in-plane magnetization to perpendicular magnetization occurs in the portion where the temperature has increased. Namely, in this portion, by exchange-coupling between the reproducing magnetic layer 106 and the recording magnetic layer 107, the magnetization direction of the recording magnetic layer 107 is transferred to the reproducing magnetic layer 106. In this manner, since the transition from the in-plane magnetization to the perpendicular magnetization occurs only in a portion where the temperature has increased, only the temperature increased portion shows a magneto-optical effect so that data information recorded on the recording magnetic layer 107 is reproduced in accordance with reflected light off the temperature increased portion.

Thereafter, when the position of the light beam is changed so as to reproduce the next recording bit, the temperature of the portion from which the data information has reproduced is reduced so that a transition from the perpendicular magnetization to the in-plane magnetization occurs. In response to this, the portion where the temperature has decreased loses the magneto-optical effect such that the magnetization recorded on the recording magnetic layer 107 is not reproduced due to the masking of the in-plane magnetization of the reproducing magnetic layer 106, thereby preventing entering of signals from adjacent bits which is the cause of a noise.

Thus, by adopting the magneto-optical recording layer 2c, it is possible to carry out reproducing with respect only to a region having a temperature not less than the predetermined temperature. This allows to reproduce a recording bit smaller than the diameter of the light beam, thereby greatly increasing the recording density.

③ Magneto-Optical Recording Layer 2d (see FIG. 4(d))

As shown in FIG. 4(d), the magneto-optical recording layer 2d has a 5-layered structure wherein the translucent dielectric layer 101, the reproducing magnetic layer 106, the translucent dielectric layer 101, the recording magnetic layer 107, and the translucent dielectric layer 101 are laminated in this order from the side of the disk substrate 1. Namely, the magneto-optical recording layer 2d has a structure of the magneto-optical recording layer 2c wherein the translucent dielectric layer 101 is further provided between the reproducing magnetic layer 106 and the recording magnetic layer 107.

Recording and reproducing of data information on and from the optical disk adopting the recording film 2 made of the magneto-optical recording layer 2d is carried out in the same manner as the recording and reproducing of data information on and from the recording film 2 of the ② magneto-optical recording layer 2c. However, in the magneto-optical recording layer 2d, since the translucent dielectric layer 101 is provided between the reproducing magnetic layer 106 and the recording magnetic layer 107, it is possible to reproduce a recording bit smaller than the diameter of the light beam, thereby greatly increasing the recording density, and reducing a recording magnetic field.

④ Magneto-Optical Recording Layer 2e (see FIG. 4(e))

As shown in FIG. 4(e), the magneto-optical recording layer 2e has an arrangement wherein the translucent dielectric layer 101, the recording magnetic layer 107, a recording supplementing magnetic layer 108, and the translucent dielectric layer 101 are laminated in this order from the side of the disk substrate 1.

The recording magnetic layer 107 has the function as described in the ② magneto-optical recording layer 2c. The recording supplementing magnetic layer 108 is made of a rare earth metal-transition metal alloy such as GdFeCo, GdDyFeCo, or GdTbFeCo. Also, the respective characteristics of the recording magnetic layer 107 and the recording supplementing magnetic layer 108 are set such that at a room temperature, the recording magnetic layer 107 has a higher coercive force than that of the recording supplementing magnetic layer 108, and the recording supplementing magnetic layer 108 has a higher Curie temperature than that of the recording magnetic layer 107.

The following describes briefly processes of overwriting which can be carried out when adopting the recording film 2 made of the magneto-optical recording layer 2e. In initialization, initialization magnetization smaller than the coercive force of the recording magnetic layer 107 but larger than the coercive force of the recording supplementing magnetic layer 108 is applied so as to align the magnetization of the recording supplementing magnetic layer 108 in one direction (for example, in an upward direction). Note that, the initialization is carried out continuously or only when recording is carried out.

Recording is carried out by applying the recording magnetic field while projecting a light beam (main beam MB) whose intensity has been modulated so as to have a high power light beam and a low power light beam. Here, the intensity of the high power light beam is set such that the temperature of the portion of the magneto-optical recording layer 2e irradiated by the high power light beam increases to a temperature in the vicinity of, or of not less than the Curie temperature of the recording supplementing magnetic layer 108. Also, the intensity of the low power light beam is set such that the temperature of the portion irradiated by the low power light beam increases to (1) a temperature in the vicinity of, or of not less than the Curie temperature of the recording magnetic layer 107 and (2) a temperature less than the Curie temperature of the recording supplementing magnetic layer 108.

Thus, after the initialization, upon projecting the high power light beam, the magnetization direction of the recording supplement magnetic layer 108 is reversed by the recording magnetic field into a direction opposite to the initial direction (for example in a downward direction). Also, the magnetization of the recording magnetic layer 107 coincides with the magnetization direction of the recording supplement magnetic layer 108 due to the exchanging force acting on the interface in a cooling process. Hence, the magnetization direction of the recording magnetic layer 107 is in the downward direction. On the other hand, when the low power light beam is projected after the initialization, the magnetization direction of the recording supplementing magnetic layer 108 is not reversed by the recording magnetic field; however, as above, the magnetization of the recording magnetic layer 107 also coincides with the magnetization direction of the recording supplement magnetic layer 108 due to the exchanging force acting on the interface in a cooling process. Hence, the magnetization direction of the recording magnetic layer 107 is in the upward direction. Note that, it is set that the recording magnetic field is significantly smaller than the initialization magnetic field. Also, it is set that the intensity of the light beam (main beam MB) when reproducing is carried out is significantly smaller than the intensity of the low power light beam when recording is carried out.

As described, in the magneto-optical disk adopting the recording film 2 made of the magneto-optical recording layer 2e, it is possible to carry out light modulation overwriting. Thus, an erasing operation is not required, thereby increasing the recording speed.

⑤ Magneto-Optical Recording Layer 2f (see FIG. 4(f))

As shown in FIG. 4(f), the magneto-optical recording layer 2f has an arrangement wherein the translucent dielectric layer 101, the recording magnetic layer 107, the recording supplementing magnetic layer 108, a switching magnetic layer 109, an initialization magnetic layer 110, and the translucent dielectric layer 101 are laminated in this order from the side of the disk substrate 1.

The recording magnetic layer 107 and the recording supplementing magnetic layer 108 respectively have the functions as described in the ② magneto-optical recording layer 2c and ④ magneto-optical recording layer 2e. The switching magnetic layer 109 is made of a rare earth metal-transition metal alloy such as DyFeCo, TbFeCo, DyTbFe, DyFe, or TbFe. The initialization magnetic layer 110 is made of a rare earth metal-transition metal alloy such as GdFeCo, GdGyFeCo, or GdTbFeCo.

Respective magnetic characteristics of the recording magnetic layer 107, the recording supplementing magnetic layer 108, the switching magnetic layer 109, and the initialization magnetic layer 110 are set so as to have the following relations: The respective magnetic forces of the recording magnetic layer 107 and the initialization magnetic layer 110 are larger than that of the recording supplementing magnetic layer 108, and the Curie temperatures of the above-mentioned layers decrease in the order of the initialization magnetic layer 110, the recording supplementing magnetic layer 108, the recording magnetic layer 107, and the switching magnetic layer 109.

The magneto-optical recording layer 2f is a light modulation overwriting medium which does not require initialization magnetic field (Hi) due to the exchange-coupled 4-layered film structure. The following describes briefly processes of the light modulation overwriting with respect to the magneto-optical recording layer 2f.

At a room temperature, the magnetization direction of the recording magnetic layer 107 of the magneto-optical recording layer 2f is fixed in the upward direction or in the downward direction so as to retain data information. Also, the magnetization direction of the initialization magnetic layer 110 is always aligned in one direction (for example, in the upward direction), and the magnetization direction of the recording supplementing magnetic layer 108 is aligned, through the switching magnetic layer 109, in the same direction as that of the initialization magnetic layer 110.

Recording is carried out by applying the recording magnetic field while projecting, on the magneto-optical recording layer 2f, a light beam (main beam MB) which has been modulated so as to have a high power light beam and a low power light beam. Here, the high power light beam is set such that the temperature of the portion irradiated by the high power light beam increases to a temperature in the vicinity of the Curie temperature of the recording supplementing magnetic layer 108. Also, the low power light beam is set such that the temperature of the portion irradiated by the low power light beam increases to a temperature in the vicinity of the Curie temperature of the recording magnetic layer 107.

Thus, when the high power light beam is projected, the magnetization direction of the recording supplementing magnetic layer 108 is reversed in the downward direction by the recording magnetic field, and the magnetization of the recording supplementing magnetic layer 108 is transferred to the recording magnetic layer 107 due to the exchanging force acting on the interface in the cooling process. Upon cooling, the magnetization direction of the recording supplementing magnetic layer 108 is aligned, through the switching magnetic layer 109, in the same direction as that of the initialization magnetic layer 110. Hence, the magnetization direction of the recording magnetic layer 107 is in the downward direction.

On the other hand, when the low power light beam is projected, because the coercive force of the recording supplementing magnetic layer 108 is stronger than the recording magnetic field, the magnetization direction of the recording supplementing magnetic layer 108 is not reversed by the recording magnetic field. However, in the same manner as described above, the magnetization direction of the recording magnetic layer 107 coincides with the magnetization direction of the recording supplementing magnetic layer 108 due to the exchanging force acting on the interface in the cooling process. Hence, the magnetization direction of the recording magnetic layer 107 is in the upward direction. Note that, it is set that the intensity of the light beam (main beam MB) when reproducing is carried out is significantly smaller than the intensity of the low power light beam when recording is carried out.

As described, in the magneto-optical disk adopting the magneto-optical recording layer 2f, it is possible to carry out the light modulation overwriting. Thus, an erasing operation is not required, thereby increasing the recording speed. Also, the initialization magnetic field is not required.

The magneto-optical recording layers 2e and 2f can adopt an arrangement wherein the reproducing magnetic layer 106 of the magneto-optical recording layers 2c and 2d is provided on the reproducing side of the recording magnetic layer 107. In an optical disk having such an arrangement, it is also possible to carry out the light modulation overwriting. Thus, an erasing operation is not required, thereby increasing the recording speed. Further, by adopting such an arrangement, it is possible to reproduce a recording bit smaller than the diameter of the light beam, thereby greatly increasing the recording density.

Note that, provided that the recording and reproducing by light and/or an external magnetic field are allowed, the arrangement of the recording film 2 of the present optical disk is not limited to the specified ones described in FIG. 4(*a*) through FIG. 4(*f*).

As described, in the method for reproducing an optical disk of the present invention, an optical disk including the tracking control-use tracking guides, composed of the grooves or lands, having (1) the wobbling part wobbled in accordance with the address information and (2) the non-wobbling part which is not wobbled, which are alternately provided in a radius direction of the optical disk, is reproduced, wherein three light beams composed of one main beam and two sub beams are projected in such manners that (a) the two sub beams are respectively on the wobbling part and the non-wobbling part adjacent to each other and (b) the main beam is on a region between the wobbling part and the non-wobbling part adjacent to each other so as to find the address information from the reflected light of one of the sub beams, irradiating the wobbling part.

With this method, the tracking guides are tracked by respective central portions of the two sub beams. Therefore, even in the case where the optical disk is tilted or vibrated, the sub beams do not deviate totally off the tracking guides, thereby permitting to stably reproduce the address information. Further, since the tracking guides are tracked by the respective central portions of the two sub beams, compared to the conventional case where reproducing is carried out by a single light beam, the address information found from the reflected light contains more signals, thereby permitting to find the address information more accurately.

Alternatively, the method for reproducing an optical disk of the present invention may adopt a method wherein one of the sub beams, irradiating the wobbling part, is recognized, and an absolute address of a region irradiated by the main beam is found from a relative positional relationship, in the radius direction of the optical disk, between (1) the sub beam irradiating the wobbling part and (2) the main beam.

With this method, it is possible to identify, from the positional relationship between (1) the sub beam irradiating the wobbling part and (2) the main beam, which of the adjacent regions separated by the wobbling part is irradiated by the main beam.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reproducing an optical disk including an optical disk substrate having tracking control-use tracking guides composed of (1) a wobbling part which is wobbled in accordance with address information and (2) a non-wobbling part which is not wobbled, the wobbling part and the non-wobbling part being provided alternately in a radius direction of said optical disk, said optical disk having information recording region provided between the wobbling part and the non-wobbling part, said method comprising the steps of:

projecting a main beam on said information recording region, and projecting two sub beams respectively on the wobbling part and the non-wobbling part of the tracking guides, respectively adjacent to said information recording region irradiated by the main beam; and finding the address information of said information recording region irradiated by the main beam in accordance with respective reflected light of the two sub beams.

2. The method as set forth in claim 1, wherein the address information of said information recording region irradiated by the main beam is found in accordance with a change in an amount of the reflected light of the sub beam irradiating the wobbling part.

3. The method as set forth in claim 1, wherein two tracking error signals are found in accordance with the respective reflected light of the two sub beams, respectively, and the address information of said information recording region irradiated by the main beam is found in accordance with one of the two tracking error signals, obtained from the reflected light of the sub beam irradiating the wobbling part.

4. The method as set forth in claim 1, wherein the address information of said information recording region irradiated by the main beam is found in accordance with the reflected light of the sub beam irradiating the wobbling part.

5. The method as set forth in claim 1, wherein the main beam and the two sub beams are irradiated in a direction inclined with respect to a circumferential direction of said optical disk.

6. The method as set forth in claim 1, wherein a tracking control is carried out in accordance with one of two tracking error signals found from the respective reflected light of the two sub beams.

7. The method as set forth in claim 6, wherein a wobbling frequency of the wobbling part is (1) higher than a tracking frequency of the tracking control and (2) lower than a recording frequency.

8. The method as set forth in claim 1, wherein an absolute address of said information recording region irradiated by the main beam is found in accordance with a relative positional relationship, in a radius direction of said optical disk, between (1) the sub beam irradiating the wobbling part and (2) the main beam.

9. The method as set forth in claim 1, wherein the tracking guides are composed of grooves formed on said optical disk substrate, and said information recording region is provided on a land formed on said optical disk substrate.

10. The method as set forth in claim 1, wherein the tracking guides are composed of lands formed on said optical disk substrate, and said information recording region is provided on a groove formed on said optical disk substrate.

11. The method as set forth in claim 1, wherein the tracking guides are provided continuously on said optical disk substrate in a spiral form, the wobbling part and the non-wobbling part being alternately provided so as to be adjacent to each other in a circumferential direction of said optical disk.

12. The method as set forth in claim 11, wherein the wobbling part and the non-wobbling part of the tracking guides are interchanged with one another for a plural number of times per rotation.

13. The method as set forth in claim 1, wherein the tracking guides are concentricly provided on said optical disk substrate.

14. The method as set forth in claim 13, wherein the wobbling part and the non-wobbling part of the tracking guides are alternately provided so as to be adjacent to each other in a circumferential direction of said optical disk, and the wobbling part and the non-wobbling part are interchanged with one another for a plural number of times per rotation.

* * * * *